United States Patent [19]
Schmitt

[11] Patent Number: 5,544,732
[45] Date of Patent: Aug. 13, 1996

[54] METHOD AND APPARATUS FOR ORIENTING AND CONVEYING FLEXIBLE OR THIN ARTICLES

[75] Inventor: Werner H. Schmitt, Falls Church, Va.

[73] Assignee: Hoppmann Corporation, Chantilly, Va.

[21] Appl. No.: 383,928

[22] Filed: Feb. 6, 1995

[51] Int. Cl.$^6$ ............................................. B65G 47/24
[52] U.S. Cl. ............................................. 198/392; 198/757
[58] Field of Search ............................ 198/756, 757, 198/392, 396

[56] References Cited

U.S. PATENT DOCUMENTS

| | | | |
|---|---|---|---|
| 2,964,182 | 12/1960 | Spurlin | 198/756 X |
| 4,000,807 | 1/1977 | Molique | 198/757 X |
| 4,007,854 | 2/1977 | Ervine | 198/392 X |
| 4,181,216 | 1/1980 | Lipu | 198/757 |
| 4,527,326 | 7/1985 | Kohno et al. | 198/392 X |
| 5,299,675 | 4/1994 | Schumann et al. | 198/392 |

FOREIGN PATENT DOCUMENTS

| | | | |
|---|---|---|---|
| 4-354718 | 12/1992 | Japan | 198/392 |
| 1404254 | 6/1988 | U.S.S.R. | 198/396 |

Primary Examiner—James R. Bidwell
Attorney, Agent, or Firm—Birch, Stewart, Kolasch & Birch, LLP

[57] ABSTRACT

An article handler for orienting and conveying flexible or thin articles. The article handler includes a centrifugal drum rotated about a central axis and a rotary disc disposed radially inward of a lower portion of the centrifugal drum. The centrifugal drum and rotary disc rotate simultaneously and a circumference of the rotary disc approaches a position adjacent to a ledge on an inner surface of the centrifugal drum at one location as the rotary disc rotates about a slanted axis. Articles which are introduced into the article handler become disposed on the ledge of the centrifugal drum in a singulated fashion. Improperly oriented articles are then removed from the ledge, and the properly oriented articles are removed from the ledge of the centrifugal drum by a beveled rotor in a similarly oriented fashion and conveyed to a packing station.

21 Claims, 2 Drawing Sheets

METHOD AND APPARATUS FOR ORIENTING AND CONVEYING FLEXIBLE OR THIN ARTICLES

BACKGROUND OF THE INVENTION

1. Field of the Invention

The present invention relates to a method and apparatus for orienting and conveying flexible or thin articles. In particular, the present invention is designed to singulate, orient and convey flexible articles such as sugar packets, salt and pepper packets, cake mix packets, and hot cocoa packets, or thin articles such as wafers and the like.

2. Brief Description of the Prior Art

It is known in the prior art to singulate, orient and convey rigid articles. However, these known devices suffer from the disadvantage that they are incapable of reliably singulating, orienting and conveying flexible or thin articles. Previously, the orientation of flexible or thin articles had to be carried out manually by hand in a tedious manner.

SUMMARY OF THE INVENTION

It is an object of the present invention to provide an article handler for orienting, singulating and conveying flexible or thin articles.

It is a further object of the present invention to provide a method of handling flexible or thin articles for orienting and conveying the articles.

It is yet another object of the present invention to provide a means for removing flexible or thin articles from a ledge of a centrifugal drum while the centrifugal drum is rotating.

It is yet another object of the present invention to provide an article handler which is easily adapted to accommodate different sized articles.

These and other objects of the present invention are accomplished by an article handler for orienting and conveying flexible or thin articles, comprising: a centrifugal drum rotated about a central axis, said centrifugal drum including an upper cylindrical wall portion, a lower wall portion and a ledge formed between said upper cylindrical wall portion and said lower wall portion for supporting an article thereon; a rotary disc disposed radially inward of said lower wall portion and rotated about a slanted axis relative to said central axis of said centrifugal drum, wherein said centrifugal drum and said rotary disc rotate simultaneously and a circumference of said rotary disc approaches a position adjacent to said ledge at one location as the rotary disc rotates about said slanted axis; and discharging means for removing articles on the ledge from said centrifugal drum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
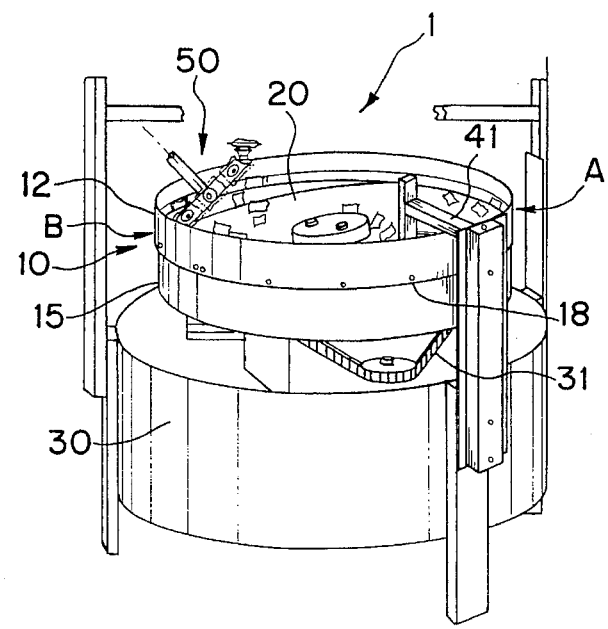
FIG. 1 illustrates a perspective view of an article handler according to the principles of the present invention.
Figure 2:
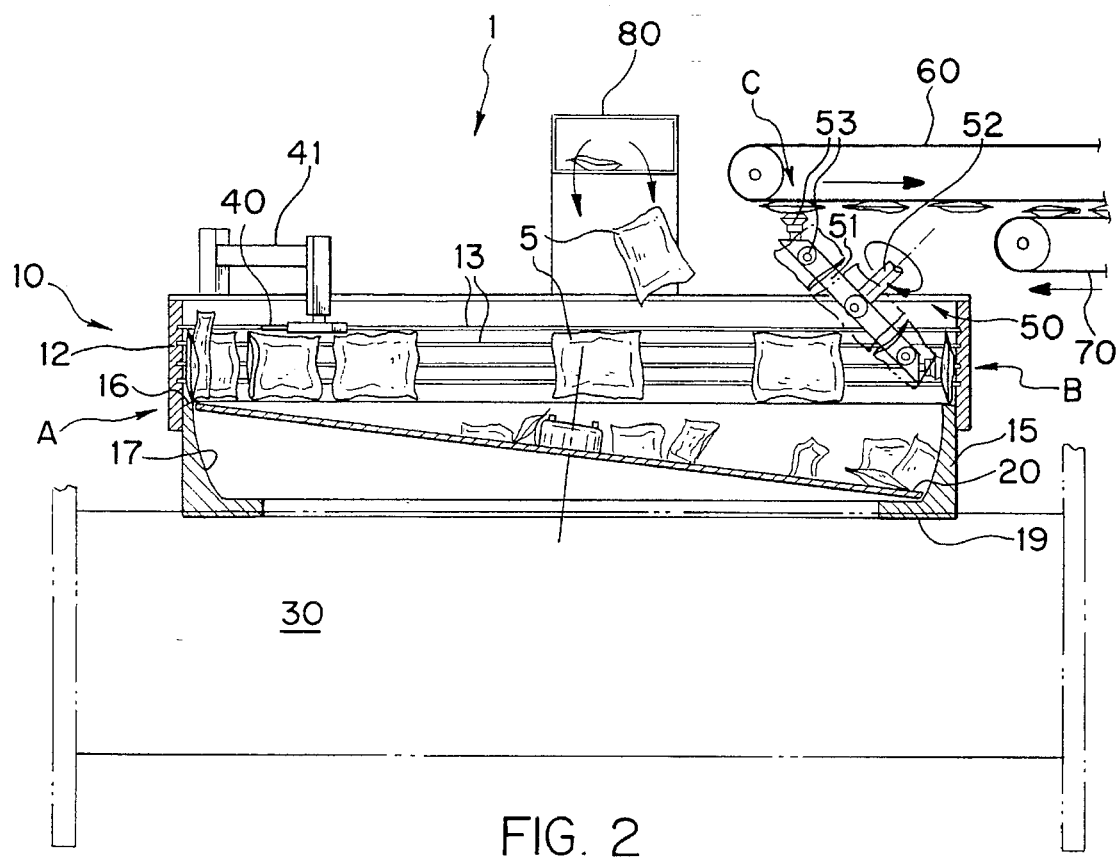
FIG. 2 illustrates a section view of the article handler according to the principles of the present invention.
Figure 3:
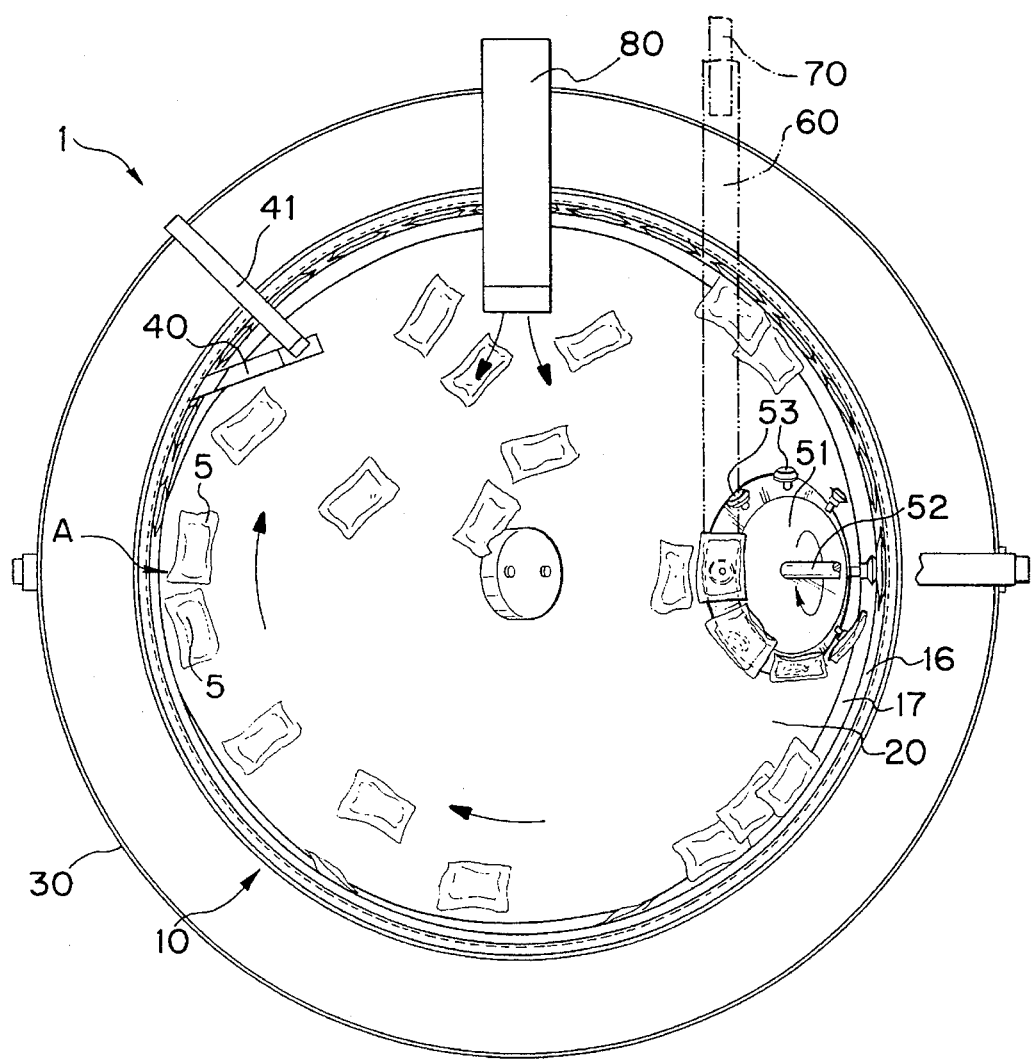
FIG. 3 illustrates a top view of the article handler according to the principles of the present invention.

The present invention will now be described with reference to FIGS. 1–3. In FIGS. 1 and 2, the article handler 1 includes a centrifugal drum 10 which is rotated about a central axis. The centrifugal drum 10 includes an upper cylindrical wall portion 12 which includes a plurality of grooves 13 which are provided on the inner surface of the upper cylindrical wall 12.

In addition, the centrifugal drum 10 also includes a lower wall portion 15 which is disposed below the upper cylindrical wall portion 12. The ledge 16 is approximately as wide as the articles 5. A ledge 16 is formed at the intersection of the lower wall portion 15 and the upper cylindrical wall portion 12. The inner face of the lower wall portion 15 is provided with a slanted surface 17 and a lower support surface 19.

The centrifugal drum 10 can be formed by an upper cylindrical wall portion 12 and a lower wall portion 15 which are mounted together by screws 18 or by other fastening means. The outer centrifugal drum 10 can also be formed as a one-piece member, as shown in FIG. 4.

A rotary disc 20 is disposed radially inward of the lower wall portion 15 and is rotated about a slanted axis Y' relative to the central axis of the centrifugal drum. The rotary disc 20 is nearly in contact with the slanted surface 17 of the lower wall portion 15.

Figure 4:
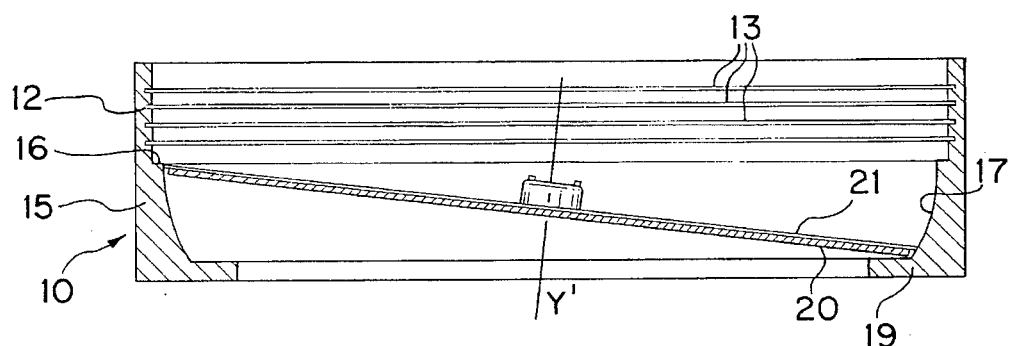
FIG. 4 illustrates a second embodiment of the present invention wherein the centrifugal drum is formed as a one-piece member, and a rubber disc is provided on the surface of the rotary disc.

The rotary disc 20 can be provided with a rubber plate 21 which is disposed on an upper surface of the rotary disc 20, as shown in FIG. 4. The rubber plate 21 serves as a friction surface for controlling the sliding of articles 5 inserted in the article handler 1. The rubber plate 21 also covers a majority of any gap between the rotary disc 20 and the centrifugal drum 10. In addition to the rubber plate 21, additional materials could be used on the surface of the rotary disc 20 in order to provide the desired frictional contact with the articles 5.

A rotary transmission section 30 is provided beneath the centrifugal drum 10 and rotary disc 20 in order to simultaneously rotate the centrifugal drum 10 and rotary disc 20.

During rotation of the centrifugal drum 10 and rotary disc 20, a circumference of the rotary disc 20 approaches a position "A" which is adjacent to the ledge 16 as the rotary disc rotates about the slanted axis Y'. It is at the location "A" that articles 5 which are supported on the rotary disc 20 are slid upward along the slanted surface 17 of the lower wall portion 15 and pushed above the ledge 16 by the rotary disc 20 where the articles 5 are maintained against the upper cylindrical wall 12 with the help of centrifugal force.

As shown in FIG. 1, the rotary transmission section 30 includes a belt drive 31 for imparting rotational movement to both the centrifugal drum 10 and rotary disc 20. However, it is to be noted that the rotary transmission section 30 can also utilize a gear system, a chain driven system or any other transmission system driven by a motor in order to depart this rotational movement. Also, the centrifugal drum 10 and rotary disc 20 can be separately driven independent of one another. Therefore the wall 12 of drum 10 can rotate at the same speed or at a different speed compared to the disc 20.

As shown in FIG. 2, a height qualifier plate 40 is provided in one of the grooves 13 for scrapping improperly oriented articles 5 from the upper cylindrical wall surface. The height qualifier plate 40 ensures that each of the articles 5 is supported on the ledge 16 in a way that is consistent with all other articles which are to be conveyed by the article handler 1. The height qualifier plate 40 is supported by a support arm 41 which can be adjusted in order to accommodate different size articles 5.

After the articles 5 are disposed on the ledge 16 and pass under the height qualifier plate 40, the articles 5 are removed from the ledge 16 of the centrifugal drum 10 by a discharging mechanism 50. The discharging mechanism 50 includes a beveled rotor 51 which is mounted on a rotary shaft 52. The beveled rotor 51 includes a plurality of suction heads 53 which are disposed on a beveled radial surface of the beveled rotor 51. Alternatively, instead of a plurality of suction heads 53, a continuous slit or a plurality of slits can be provided around the circumference of the beveled rotor 51. Suction can then be applied to the articles 5 through this continuous slit or through the plurality of slits.

The rotary shaft 52 rotates about an axis which is approximately 45° from horizontal. The beveled rotor 51 is disposed such that at a location "B" the beveled surface of the beveled rotor is approximately parallel to the surface of the upper cylindrical wall 12. In addition, the beveled rotor at location "B" is located radially inward of the upper cylindrical wall 12 at a distance wherein the suction heads 53 are disposed at a distance approximately equal to the thickness of the articles 5 away from the upper cylindrical wall 12.

A suction pressure is provided to each of the suction heads 53 by a conduit, not shown, which is provided in the rotary shaft 52 and which is connected to each of the suction heads 53. As the beveled rotor 51 rotates, the suction in the suction heads 53 attract the articles 5 which are disposed on the ledge 16 of the centrifugal drum 10. The suction heads 53 then discharge the articles 5 from the centrifugal drum due to the rotation of the beveled rotor 51.

As the articles 5 disposed on the suction heads 53 reach the highest vertical location "C" the articles 5 are transferred to a downward facing portion of a suction conveyor 60 which is provided with a greater suction force than the suction force supplied to each suction head 53. Alternatively, the suction for heads 53 at the highest location "C" can be turned off to enable a smooth transfer of articles 5 to the suction conveyor 60. This conveyor 60 can comprise two belts with suction being supplied between the belts or can be any other suitable conveyor arrangement.

During the transfer of the articles 5 from the discharging mechanism 50 to the suction conveyor 60, each of the articles 5 is similarly oriented. From the suction conveyor 60, the articles 5 are further transferred to a second conveyor 70 which conveys the similarly oriented articles 5 to a packing station.

Additional articles 5 are supplied to the article handler 1 by a supply chute 80 which is disposed above the article handler 1. As shown in FIG. 2, the suction conveyors 60, 70 are perpendicularly oriented with respect to the supply chute 80. On the other hand, the conveyors 60, 70 can be positioned as indicated in dotted lines in FIG. 3. This FIG. 3 orientation is 90° offset from that orientation shown in FIG. 2. In either arrangement, articles 5 can be transferred from the suction heads 53 on beveled rotor 51.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An article handler for orienting and conveying flexible or thin articles, comprising:

a centrifugal drum rotatable about a central axis, said centrifugal drum including an upper cylindrical wall portion, a lower wall portion and a ledge formed between said upper cylindrical wall portion and said lower wall portion for supporting an article thereon; both the upper wall portion and the lower wall portion being vertically oriented;

a rotary disc disposed radially inward of said lower wall portion and rotated about a slanted axis relative to said central axis of said centrifugal drum, said centrifugal drum including the upper and lower wall portions and said rotary disc rotate simultaneously and a circumference of said rotary disc approaches a position adjacent to said ledge at one location as the rotary disc rotates about said slanted axis; and discharging means for removing articles on the ledge from said centrifugal drum.

2. The article handler according to claim 1, further comprising a height qualifier plate for removing improperly oriented articles from the ledge.

3. The article handler according to claim 2, wherein said height qualifier plate engages with an internal groove in said upper cylindrical wall portion.

4. The article handler according to claim 3, wherein said upper cylindrical wall portion is provided with a plurality of internal circumferential grooves, the height qualifier plate being adjustable to be engageable with one of the plurality of grooves.

5. The article handler according to claim 1, wherein said upper cylindrical wall portion and said lower wall portion are formed as a one-piece member.

6. The article handler according to claim 1, further comprising a rubber disc provided on a top surface of said rotary disc, the rubber disc covering a majority of any gap between the rotary disc and the centrifugal drum and providing additional friction force.

7. The article handler according to claim 1, wherein said discharging means includes a beveled rotor having at least one suction opening for receiving a suction therethrough and attracting an article which is located on the ledge of said centrifugal drum.

8. The article handler according to claim 7, further comprising an air suction conveyor for receiving an article from said at least one suction opening as said beveled rotor rotates, wherein each article received by said air suction conveyor is similarly oriented on a downwardly facing surface of said air suction conveyor.

9. The article handler according to claim 8, further comprising a double belt conveyor with suction being supplied between belts of the double belt conveyor for receiving an article from said at least one suction opening of the beveled rotor.

10. The article handler according to claim 8, further comprising a second conveyor for receiving articles from said air suction conveyor.

11. The article handler according to claim 1, further comprising an article supply chute for delivering articles to the article handler.

12. The article handler according to claim 7, further comprising suction pressure means for supplying a suction pressure to said at least one suction opening, wherein said suction pressure to said at least one suction opening can be interrupted while the centrifugal drum and rotary disc continue to rotate.

13. The article handler according to claim 1, wherein said ledge has a thickness approximately equal to a thickness of said articles.

14. The article handler according to claim 1, wherein said centrifugal drum and said rotary disc rotate at either the same or different speeds.

15. A method of handling flexible or thin article, comprising the steps of:

introducing articles into a centrifugal drum having an upper cylindrical wall portion, a lower wall portion and a ledge disposed therebetween and a rotary disc disposed radially inward of said lower wall portion and rotated about a slanted axis relative to a central axis of said centrifugal drum, both the upper wall portion on the lower wall portion being vertically oriented;

rotating said centrifugal drum including the upper and lower wall portions and said rotary disc simultaneously wherein a circumference of said rotary disc approaches a position adjacent to said ledge at one location as the rotary disc rotates about said slanted axis, wherein centrifugal force of said centrifugal drum causes said articles to slide to a radial outermost portion of said rotary disc and against said lower wall portion and the articles are pushed upward along the lower wall portion and onto the ledge at said one location; and removing articles on the ledge from said centrifugal drum.

16. The method of handling flexible or thin articles according to claim 15, further comprising the step of knocking off improperly oriented articles on the ledge.

17. The method of handling flexible or thin articles according to claim 15, wherein said step of removing articles on the ledge from said centrifugal drum includes the steps of rotating a beveled rotor having at least one suction opening for receiving a suction therethrough and attracting an article which is located on the ledge of said centrifugal drum to said at least one suction opening.

18. The method of handling flexible or thin articles according to claim 17, further comprising the step of transferring articles from said at least one suction opening to a downwardly facing surface of an air suction conveyor.

19. The method of handling flexible or thin articles according to claim 14, wherein the centrifugal drum and the rotary disc are rotated at the same speed.

20. The method of handling flexible or thin articles according to claim 14, wherein the centrifugal drum and the rotary disc are rotated at different speeds.

21. The article handler according to claim 1, wherein the upper wall portion of the centrifugal drum is continuous and unbroken.

* * * * *